(12) United States Patent
Liu et al.

(10) Patent No.: US 11,526,743 B2
(45) Date of Patent: Dec. 13, 2022

(54) ARTIFICIAL NEURAL NETWORK OPTICAL HARDWARE ACCELERATOR

(71) Applicant: Arm Limited, Cambridge (GB)

(72) Inventors: Zhi-Gang Liu, Westford, MA (US); Matthew Mattina, Boylston, MA (US); John Fremont Brown, III, Marion, MA (US)

(73) Assignee: Arm Limited, Cambridge (GB)

( * ) Notice: Subject to any disclaimer, the term of this patent is extended or adjusted under 35 U.S.C. 154(b) by 460 days.

(21) Appl. No.: 16/818,302

(22) Filed: Mar. 13, 2020

(65) Prior Publication Data
US 2021/0287078 A1    Sep. 16, 2021

(51) Int. Cl.
*G06N 3/067* (2006.01)
*G06N 3/04* (2006.01)
*G06N 3/08* (2006.01)

(52) U.S. Cl.
CPC ............. *G06N 3/0675* (2013.01); *G06N 3/04* (2013.01); *G06N 3/084* (2013.01)

(58) Field of Classification Search
CPC ...... G06N 3/04; G06N 3/0454; G06N 3/0675; G06N 3/08; G06N 3/084
See application file for complete search history.

(56) References Cited

U.S. PATENT DOCUMENTS

| 8,824,779 | B1* | 9/2014 | Smyth | G06T 7/73 |
| | | | | 382/117 |
| 2012/0166374 | A1* | 6/2012 | Moussa | G06N 3/084 |
| | | | | 706/30 |
| 2018/0343077 | A1* | 11/2018 | Al Sayeed | H04J 14/0221 |
| 2019/0370652 | A1* | 12/2019 | Shen | G06E 3/006 |
| 2020/0019851 | A1* | 1/2020 | Mehrabian | G06N 3/067 |

(Continued)

OTHER PUBLICATIONS

Tohru Ishihara,"An Optical Neural Network Architecture based on Highly Parallelized WDM-Multiplier-Accumulator,"Jan. 9, 2020,2019 IEEE/ACM Workshop on Photonics-Optics Technology Oriented Networking, Information and Computing Systems (Photonics),pp. 15-19.*

(Continued)

*Primary Examiner* — Omar S Ismail
(74) *Attorney, Agent, or Firm* — Leveque Intellectual Property Law, P.C.

(57) ABSTRACT

The present disclosure advantageously provides an Optical Hardware Accelerator (OHA) for an Artificial Neural Network (ANN) that includes a communication bus interface, a memory, a controller, and an optical computing engine (OCE). The OCE is configured to execute an ANN model with ANN weights. Each ANN weight includes a quantized phase shift value $\theta_i$ and a phase shift value $\phi_i$. The OCE includes a digital-to-optical (D/O) converter configured to generate input optical signals based on the input data, an optical neural network (ONN) configured to generate output optical signals based on the input optical signals, and an optical-to-digital (O/D) converter configured to generate the output data based on the output optical signals. The ONN includes a plurality of optical units (OUs), and each OU includes an optical multiply and accumulate (OMAC) module.

24 Claims, 9 Drawing Sheets

(56) References Cited

U.S. PATENT DOCUMENTS

| | | | |
|---|---|---|---|
| 2020/0110992 A1* | 4/2020 | Hosseinzadeh | G06N 3/0472 |
| 2020/0272881 A1* | 8/2020 | Lo | G06F 7/483 |
| 2020/0279153 A1* | 9/2020 | Fowers | G06N 3/08 |
| 2021/0056358 A1* | 2/2021 | Macfaden | G06N 3/067 |
| 2021/0064958 A1* | 3/2021 | Lin | G06N 3/04 |
| 2021/0182077 A1* | 6/2021 | Chen | G06V 10/82 |
| 2021/0357737 A1* | 11/2021 | Hamerly | G06N 3/0675 |

OTHER PUBLICATIONS

Yichen Shen, "Deep Learning with Coherent Nanophotonic Circuits," Oct. 7, 2016, arXiv:1610.02365v1 [physics.optics], pp. 1-6.*

Nicholas C. Harris, "Linear programmable nanophotonic processors," Dec. 20, 2018, vol. 5, No. 12 / Dec. 2018 / Optica, pp. 1623-1628.*

Jiaqi Gu, "ROQ: A Noise-Aware Quantization Scheme Towards Robust Optical Neural Networks with Low-bit Controls," Jun. 15, 2020, 2020 Design, Automation & Test in Europe Conference & Exhibition (DATE) pp. 1586-1589.*

Yufeng Li, "High-performance Convolutional Neural Network Accelerator Based on Systolic Arrays and Quantization," Oct. 7, 2019, 2019 IEEE 4th International Conference on Signal and Image Processing (ICSIP), pp. 335-338.*

Mankit Sit, "FPGA-based Accelerator for Losslessly Quantized Convolutional Neural Networks," Feb. 5, 2018, 2017 International Conference on Field Programmable Technology (ICFPT), pp. 295-297.*

Gu et al, "ROQ: A Noise-Aware Quantization Scheme Towards Robust Optical Neural Networks with Low-bit Controls," 2020 Design, Automation & Test in Europe (DATE) Conference & Exhibition, Mar. 9, 2020, pp. 1586-1589, doi: 10.23919/DATE48585.2020.9116521.

Shen et al., "Deep Learning with Coherent Nanophotonic Circuits," arXiv: 1610.02365v1 [physics.optics] Oct. 7, 2016.

Clements et al., "Optimal design for universal multiport interferometers," Optica vol. 3, Issue 12, pp. 1460-1465 (2016).

D. Miller, "Perfect optics with imperfect components," Optica vol. 2, Issue 8, pp. 747-750 (2015).

Reck et al., "Experimental Realization of Any Discrete Unitary Operator," Physical Review Letters vol. 73, No. 1, pp. 58-61 (Jul. 4, 1994).

Carolan et al., "Universal Linear Optics," arXiv:1505.01182v1 [quant-ph] May 5, 2015.

Harris et al., "Linear programmable nanophotonic processors," Optica 5, Issue 12, pp. 1623-1631 (2018).

* cited by examiner

ARTIFICIAL NEURAL NETWORK OPTICAL HARDWARE ACCELERATOR

BACKGROUND

The present disclosure relates to computer systems. More particularly, the present disclosure relates to computer systems that include neural networks.

Artificial neural networks (ANNs), such as deep neural networks (DNNs), convolutional neural networks (CNNs), etc., are a popular solution to a wide array of challenging classification, recognition and regression problems. However, many ANNs require a large number of calculations involving a large number of weights and activations, which presents a significant challenge with respect to performance, access and storage, particularly for mobile and other power or storage-constrained devices.

An ANN hardware accelerator increases the speed of these calculations when compared to the central processor of a mobile device. ANN hardware accelerators may include one or more processors, coprocessors, matrix multiplier units, multiply-and-accumulate (MAC) arrays, etc. For example, a common approach to implementing the convolutional layers of a CNN is to convert the convolution operations into generic matrix multiplication (GEMM) operations that are performed by the ANN hardware accelerator. However, these GEMM operations consume significant computing power due to the large number of multiplications required.

DETAILED DESCRIPTION

Figure 1:
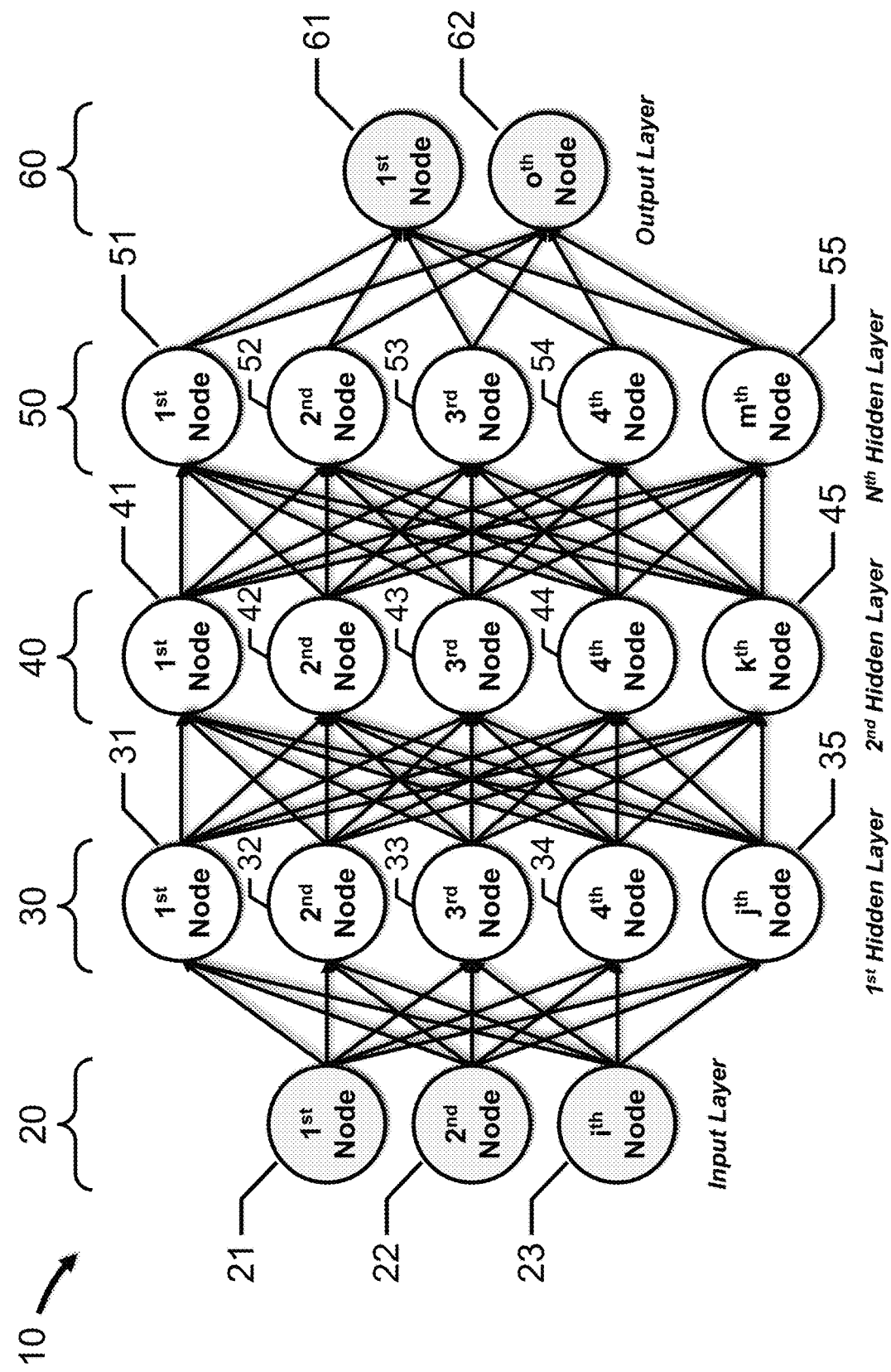
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provide an optical hardware accelerator (OHA) for an ANN that includes an optical computing engine (OCE) that is configured to execute an ANN model with ANN weights. The ANN weights are phase shift values that are determined and quantized during the training of the ANN model. Due to the physical properties of the optical medium and the quantized phase shift values, the ANN optical hardware accelerator advantageously provides much faster computation, significantly reduces power consumption, and reduces memory bandwidth when compared to conventional ANN hardware accelerators.

In one embodiment, an OHA for an ANN includes a communication bus interface, a memory coupled to the communication bus interface, a controller coupled to the communication bus interface and the memory, and an OCE coupled to the memory and the controller. The OCE is configured to execute at least a portion of an ANN model with ANN weights, each ANN weight including a quantized phase shift value $\theta_i$ and a phase shift value $\phi_i$. The OCE includes a digital-to-optical (D/O) converter configured to generate input optical signals based on the input data, an optical neural network (ONN) configured to generate output optical signals based on the input optical signals, and an optical-to-digital (O/D) converter configured to generate the output data based on the output optical signals.

The ONN includes a plurality of optical units (OUs). Each OU includes an optical multiply and accumulate (OMAC) module. Each OMAC module includes an array of OMAC elements, and each OMAC element includes a Mach-Zehnder Interferometer (MZI) and a single-node phase shifter. Each MZI is configured to apply a phase shift equal to the quantized phase shift value $\theta_i$ of a corresponding ANN weight to an optical signal. Each single-node phase shifter is configured to apply a phase shift equal to the phase shift value $\phi_i$ of the corresponding ANN weight to the optical signal.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

FIG. 1 depicts an ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network. In other backpropagation methods, the gradient descent is not needed.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
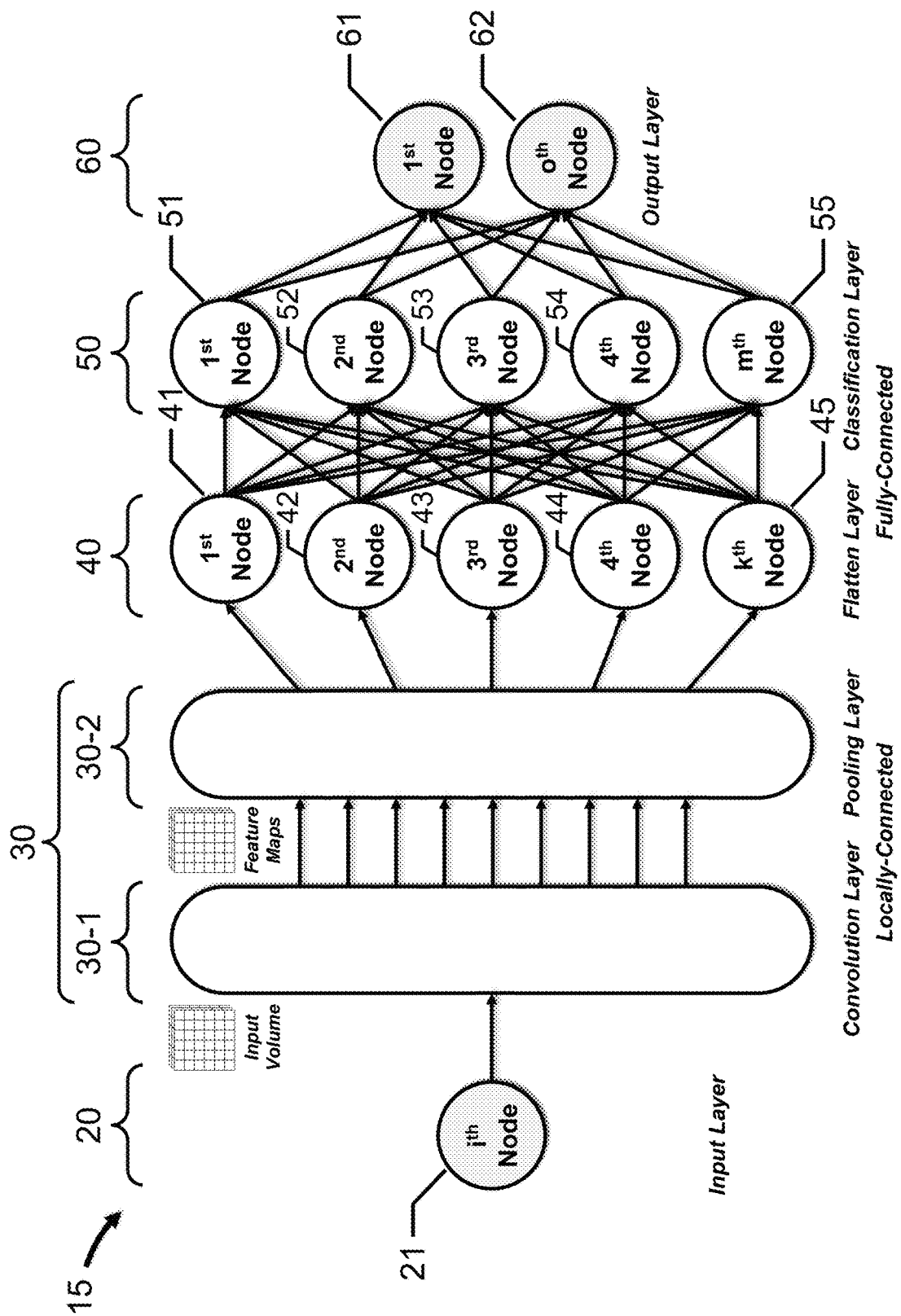
FIG. 2 depicts a CNN, in accordance with an embodiment of the present disclosure.

FIG. 2 depicts a CNN 15, in accordance with an embodiment of the present disclosure. CNN 15 includes input layer 20, one or more hidden layers, such as convolutional layer 30-1, pooling layer 30-2, hidden (flatten) layer 40, hidden (classification) layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLU layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more hidden (flatten) nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more hidden (classification) nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, MAC operations, are used extensively by ANNs, CNNs, etc.

Figure 3:
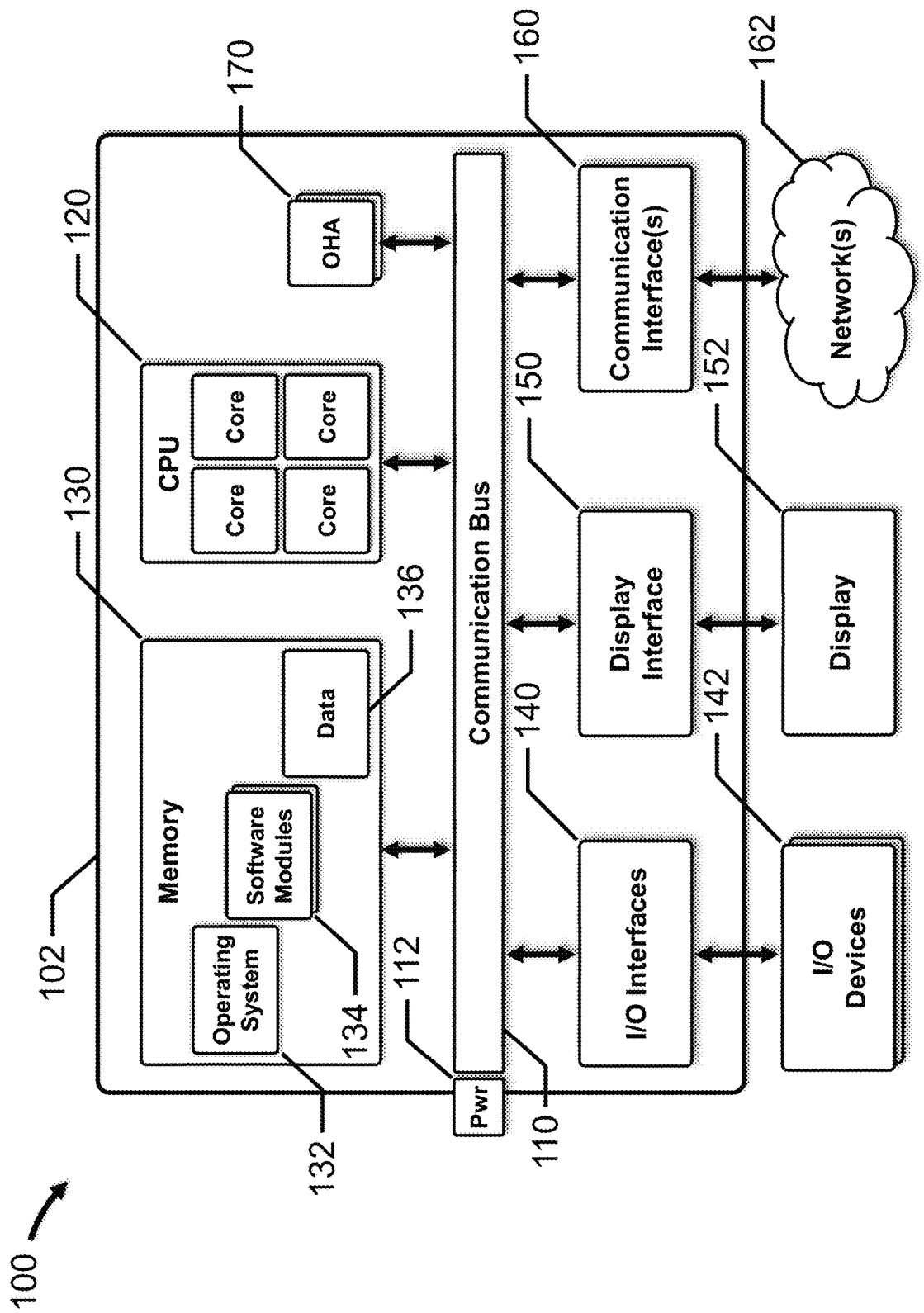
FIG. 3 depicts a block diagram of a system, in accordance with embodiments of the present disclosure.

FIG. 3 depicts a block diagram of a system 100, in accordance with embodiments of the present disclosure.

System 100 includes communication bus 110 coupled to one or more processors 120, memory 130, I/O interfaces 140, display interface 150, one or more communication interfaces 160, and one or more OHAs 170. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Communication bus 110 is a communication system that transfers data between processor 120, memory 130, I/O interfaces 140, display interface 150, communication interface 160, OHA 170, as well as other components not depicted in FIG. 3. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 3. Generally, system 100 may include one or more processors 120, each containing one or more processing cores.

For example, system 100 may include 2 processors 120, each containing multiple processing cores. In certain embodiments, the CPUs form a heterogeneous processing architecture, such as, for example, Arm's "big.LITTLE" architecture, that couples relatively battery-saving and slower processor cores ("LITTLE" cores) with relatively more powerful and power-hungry processing cores ("big" cores). For example, one processor 120 may be a high performance processor containing 4 "big" processing cores, e.g., Arm Cortex-A73, Cortex-A75, Cortex-A76, etc., while the other processor 120 may be a high efficiency processor containing 4 "little" processing cores, e.g., Arm Cortex-53, Arm Cortex-55, etc. In certain embodiments, processor 120 may also be configured to execute at least a portion of a classification-based machine learning model, such as, for example, an ANN, DNN, CNN, RNN, etc.

In addition, processor 120 may execute computer programs or modules, such as operating system 132, software modules 134, etc., stored within memory 130. For example, software modules 134 may include a machine learning (ML) application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic random access memory (DRAM), SRAM, ROM, flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

OHA 170 is configured to execute machine learning models, such as, for example, ANNs, DNNs, CNNs, RNNs, etc., in support of various applications embodied by software modules 134. Generally, OHA 170 includes one or more OCEs, as well as a controller, microcontroller, etc., a communications bus interface, and one or more non-volatile and/or volatile memories, such as, for example, ROM, flash memory, SRAM, DRAM, etc. The OCE implements at least a portion of an ANN model with ANN weights as an ONN, which generally includes silicon photonic circuits, digital-to-optical (D/O) converters, optical-to-digital (O/D) converters, etc. Generally, OHA 170 receives input data from memory 130 over communication bus 110, and transmits output data to memory 130 over communication bus 110.

Figure 4:
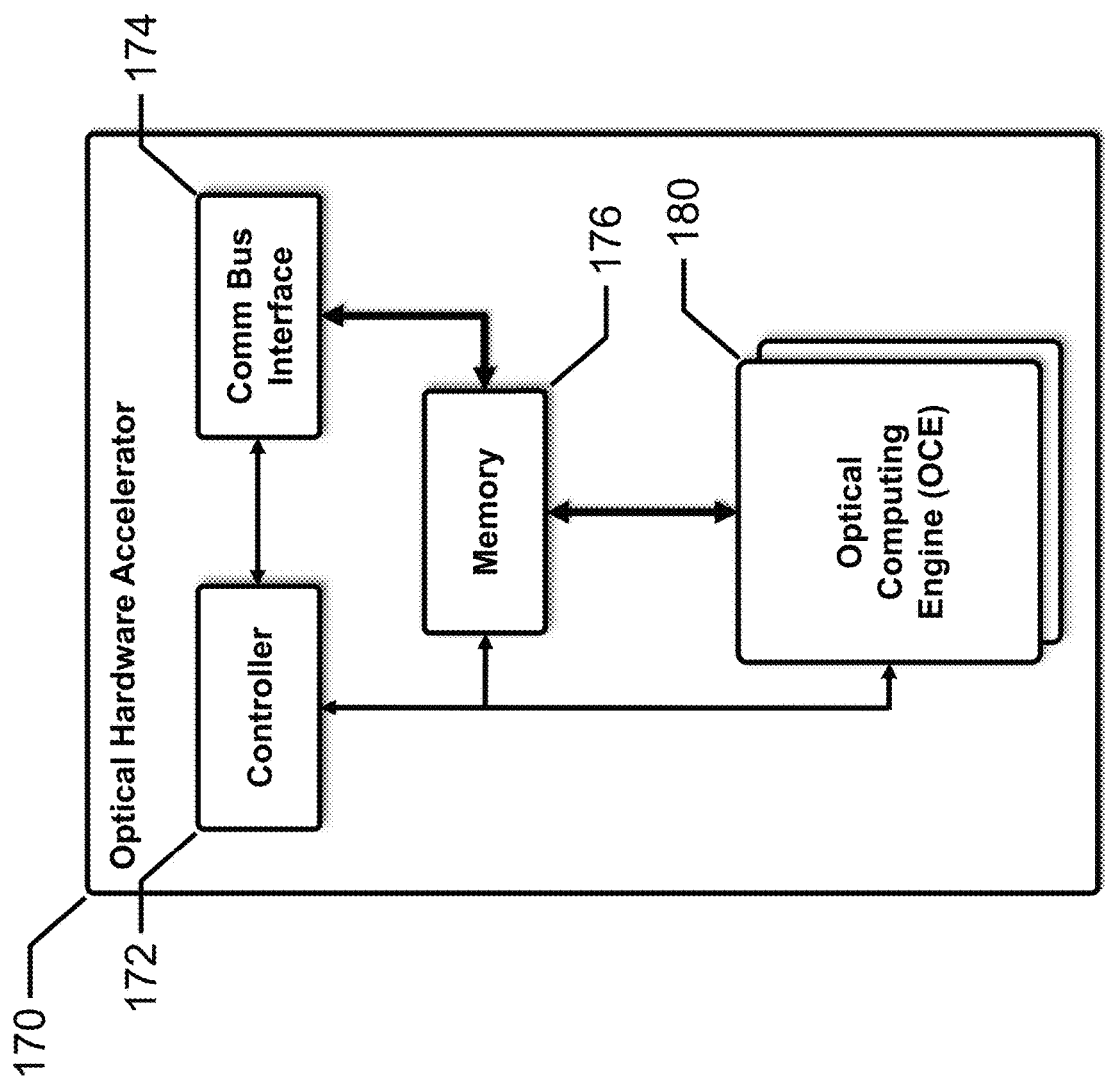
FIG. 4 depicts a block diagram of an optical hardware accelerator for an ANN, in accordance with embodiments of the present disclosure.

FIG. 4 depicts a block diagram of an OHA 170 for an ANN, in accordance with embodiments of the present disclosure. OHA 170 includes controller 172, communication bus interface 174, memory 176, and one or more OCEs 180. Controller 172 is coupled to communication bus interface 174, memory 176 and OCE 180, and generally controls the components, functions, data flow, etc. of OHA 170. Communication bus interface 174 is coupled to communication bus 110 and memory 176, which is coupled to OCE 180.

In certain embodiments, a single OCE 180 executes the complete ANN model using the ANN weights, each of which includes a quantized phase shift value $\theta_i$ and a phase shift value $\phi_i$, as discussed in more detail below. In other embodiments, multiple OCEs 180 may be interconnected by a NoC using a ring topology, a star topology, a mesh topology, etc., or, alternatively, using a cross-bar switch, direct connections, etc. In these embodiments, each OCE 180 executes at least a portion of the ANN model using a portion of the ANN weights.

Figure 5:
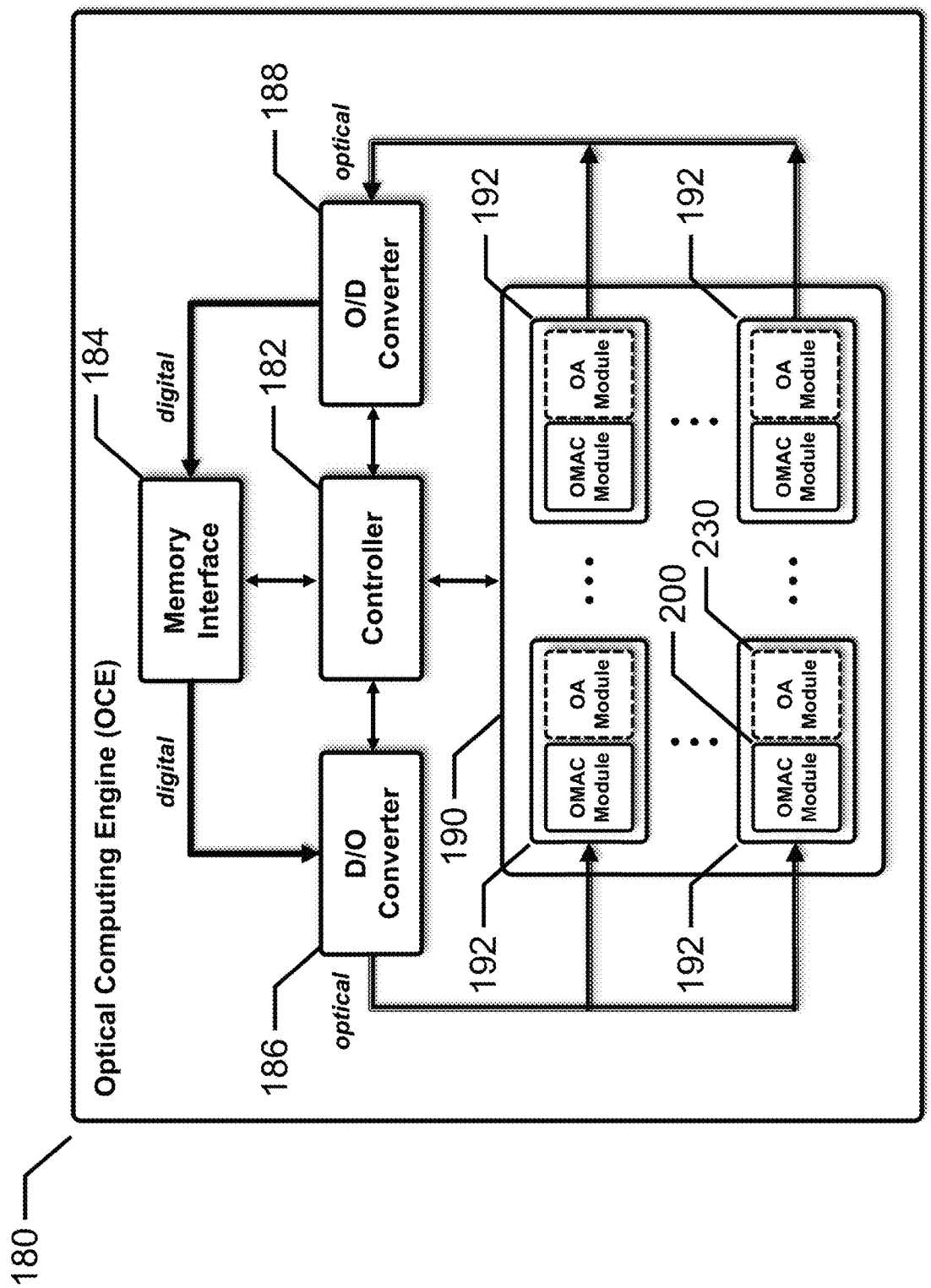
FIG. 5 depicts a block diagram of an optical computing engine, in accordance with embodiments of the present disclosure.

FIG. 5 depicts a block diagram of an OCE 180, in accordance with embodiments of the present disclosure.

OCE 180 includes controller 182, memory interface 184, D/O converter 186, O/D converter 188 and ONN 190. Controller 182 is coupled to memory interface 184, D/O converter 186, O/D converter 188 and ONN 190, as well as controller 172, and generally controls the components, functions, data flow, etc. of OCE 180. Memory interface 184 is coupled to memory 176, D/O converter 186 and O/D converter 188. D/O converter 186 is optically-coupled to ONN 190 via one or more optical fibers, optical channels, etc., and ONN 190 is optically-coupled to O/D converter 188 via one or more optical fibers, optical channels, etc.

ONN 190 includes an array of optical units (OUs) 192 that are optically-coupled, in a particular configuration, to implement an ANN model, a portion of an ANN model, etc. In many embodiments, ONN 190 implements an entire ANN model. In other embodiments, ONN 190 implements a portion of the ANN model, such as, for example, one or more layers of an ANN or CNN model, one or more convolutional layers of a CNN model, a portion of a convolutional layer of a CNN model, etc. Any remaining layers or portions of layers of the ANN model that are not implemented by ONN 190, such as, for example, one or more fully-connected layers of a CNN model, etc., may be implemented by a separate digital processor, such as, for example, processor 120, a dedicated coprocessor coupled to communication bus 110, a graphics processing unit (GPU) coupled to communication bus 110, etc. In the alternative embodiment depicted in FIG. 8 and discussed in more detail below, OHA 270 includes OCE 280 to implement certain layers of an ANN model, and digital computing engine (DCE) 278 to implement the remaining layers or layer portions of the ANN model.

Generally, the configuration of the array of OUs 192 will be determined by the architecture of the ANN model. FIG. 5 depicts an embodiment in which the OU array configuration has one or more rows, and each row includes one or more OUs 192. Input optical signals are provided by D/O converter 186 to the first OU 192 in each row, and output optical signals are provided by the last OU 192 in each row to O/D converter 188. In this embodiment, each OU 192 is optically-connected to a succeeding OU 192 in the same row (locally-connected). In other embodiments, each OU 192 is optically-coupled to a succeeding OU 192 in all of the rows (fully-connected). In further embodiments, a combination of locally-connected and fully-connected OUs 192 may be implemented. Each layer of the ANN model may include one or more OUs 192 that are locally-connected or fully-connected.

For example, an ANN model may include an input layer, one or more hidden layers and an output layer, and each OU 192 may be assigned to one of the ANN model layers. The input optical signals are provided to the OUs 192 in the input layer by D/O converter 186. The optical signals generated by the OUs 192 in the input layer are provided to the OUs 192 in a succeeding hidden layer. The optical signals generated by the OUs 192 in each hidden layer are provided to succeeding OUs 192 in the same hidden layer, the OUs 192 in a succeeding hidden layer or the OUs 192 in the output layer, depending upon the architecture of the ANN model. Finally, the optical signals generated by the OUs 192 in the output layer are provided to O/D converter 188.

In certain embodiments, the configuration of the array of OUs 192 supports the processing of a portion of a layer of an ANN, such as, for example, a portion of a convolutional layer of a CNN. In these embodiments, the array of OUs 192 provide many advantages over an array of MAC units, including much faster computation, significant reduction in power consumption, reduction in memory bandwidth, etc., as discussed above.

Each OU 192 includes an optical multiply and accumulate (OMAC) module 200. Generally, each OMAC module 200 is configured to apply a portion of the ANN weights, in the form of quantized phase shift values $\theta_i$ and a phase shift values $\phi_i$, to optical signals input thereto, and then output optical signals to the next OU 192. If desired, activation function(s) may be applied to the digital signals output from O/D converter 188 using analog circuitry or digital processing (not shown for clarity) provided by OCE 180. Alternatively, the digital signals output from O/D converter 188 may be transferred to memory 176 and then provided to analog circuitry or digital processing (not shown for clarity) provided by OHA 170, or sent to processor 120, a dedicated coprocessor coupled to communication bus 110, a graphics processing unit (GPU) coupled to communication bus 110, etc. For example, in the alternative embodiment depicted in FIG. 8 and discussed in more detail below, OHA 270 may include OCE 280 to implement certain layers or portions of certain layers of an ANN model, and DCE 278 to apply the activation functions.

In certain embodiments, each OU 192 also includes an optical activation (OA) module 230 to receive the optical signals from the associated OMAC module 200. Each OA module 230 is configured to apply an activation function, in the form of a nonlinear phase shift, to the optical signals output from the associated OMAC module 200. Generally, OA module 230 is a nonlinear optical device, such as, for example, a bistable optical crystal, a saturable absorber, etc.

Figure 6A:
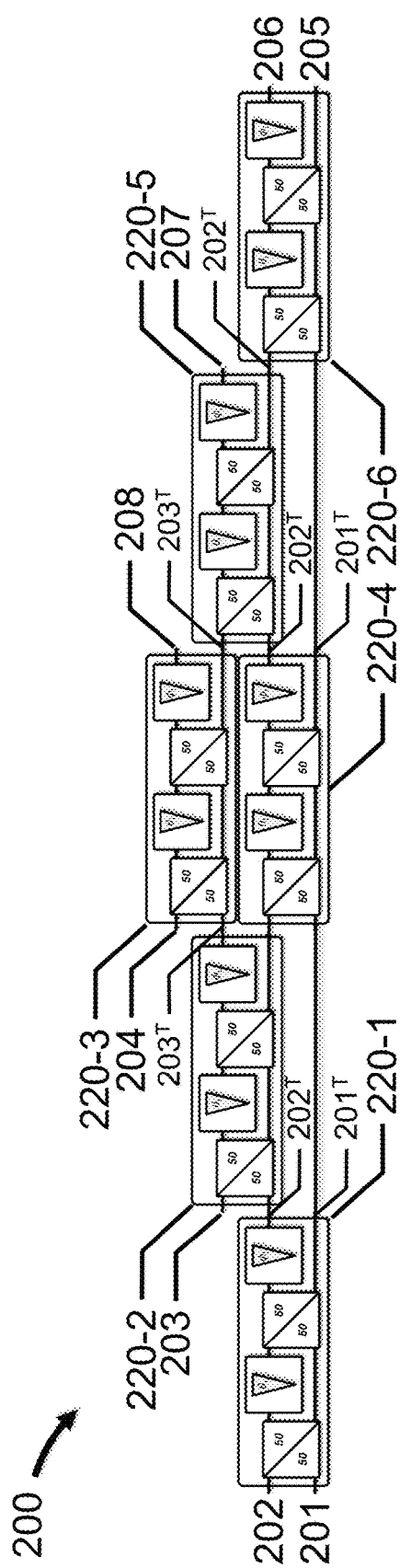
FIG. 6A depicts a block diagram of an optical multiply and accumulate module and FIG. 6B depicts a block diagram of an optical multiply and accumulate element, in accordance with embodiments of the present disclosure.
Figure 6B:
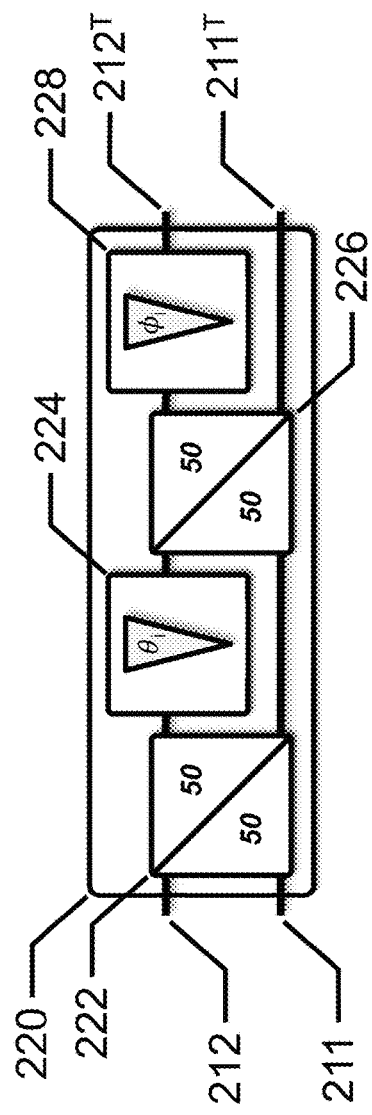

FIG. 6A depicts a block diagram of an OMAC module 200 and FIG. 6B depicts a block diagram of an OMAC element 220, in accordance with embodiments of the present disclosure.

Each OMAC module 200 includes an array of OMAC elements 220 that form a silicon photonic circuit. In the embodiment depicted in FIG. 6A, OMAC module 200 includes six (6) OMAC elements 210, i.e., OMAC elements 220-1, 220-2, 220-3, 220-4, 220-5 and 220-6, arranged in a triangular structure. In an alterative embodiment, OMAC elements 210 may be arranged in a rectangular structure. OMAC module 200 optically transforms four (4) input optical signals, i.e., optical signal 201 ($a_1$), optical signal 202 ($a_2$), optical signal 203 ($a_3$) and optical signal 204 ($a_4$), into four (4) output optical signals, i.e., optical signal 205 ($y_1$), optical signal 206 ($y_2$), optical signal 207 ($y_3$) and optical signal 208 ($y_4$). As discussed in more detail below, this optical transformation represents the matrix multiplication of Y=W*A, where Y is represented by output optical signals 205, 206, 207 and 208, W is represented by the quantized phase shift values $\theta_i$ and phase shift value $\phi_i$, and A is represented by input optical signals 201, 202, 203 and 204.

In this embodiment, OMAC module 200 includes six OMAC elements 220 that multiply a weight matrix (4×4) and an input vector (4×1) to generate an output vector (4×1). Different matrix dimensions may be multiplied by using different numbers of OMAC elements 220 according to the relationship N(N−1)/2, where N is the number of OMAC elements 220. For example, multiplying a weight matrix (2×2) and an input vector (2×1) to generate an output vector (2×1) requires one OMAC element 220, multiplying a weight matrix (6×6) and an input vector (6×1) to generate an output vector (6×1) requires 15 OMAC elements 220 arranged in a triangular or rectangular structure, etc.

With respect to FIG. 6A, generally, each OMAC element 220 receives a pair of optical signals and generates a pair of transformed optical signals. OMAC element 220 is a two port, silicon photonic device that is configured to apply two phase shifts corresponding an ANN weight to input optical signal 212, i.e., a first phase shift equal to the quantized phase shift value $\theta_i$, and a second phase shift equal to the phase shift value $\phi_i$.

Optical signals 201 ($a_1$) and 202 ($a_2$) are input to OMAC element 220-1. Optical signal 203 ($a_3$) and transformed optical signal $202^T$ (output by OMAC element 220-1) are input to OMAC element 220-2. Optical signal 204 ($a_4$) and transformed optical signal $203^T$ (output by OMAC element 220-2) are input to OMAC element 220-3. Transformed optical signal $201^T$ (output by OMAC element 220-1) and transformed optical signal $202^T$ (output by OMAC element 220-2; not labeled for clarity) are input to OMAC element 220-4. Transformed optical signal $202^T$ (output by OMAC element 220-4) and transformed optical signal $203^T$ (output by OMAC element 220-3) are input to OMAC element 220-5. Transformed optical signal $201^T$ (output by OMAC element 220-4) and transformed optical signal $202^T$ (output by OMAC element 220-5; not labeled for clarity) are input to OMAC element 220-6. OMAC element 220-3 transforms optical signal 204 into output optical signal 208, OMAC element 220-5 transforms optical signal $203^T$ into output optical signal 207, OMAC element 220-6 transforms optical signals $201^T$ and $202^T$ into output optical signals 205 and 206, respectively.

With respect to FIG. 6B, optical signal 211 is coupled to 3 dB (50%) beam splitter 222 and then 3 dB (50%) beam splitter 226, which transforms optical signal 211 into transformed optical signal $211^T$. Input optical signal 212 is coupled to beam splitter 222, phase shifter 224, beam splitter 226 and then phase shifter 228, which transforms input optical signal 212 into transformed optical signal $212^T$. Beam splitter 222, phase shifter 224 and beam splitter 226 form a Mach-Zehnder Interferometer (MZI).

The superposition of two amplitudes of coherent input waves performs an arbitrary U(2) transformation, as given by Equation 1, where $\theta$ is the phase shift applied by phase shifter 224, and $\phi$ is the phase shift applied by phase shifter 228. In many embodiments, $\phi=0$ or $\pi$.

$$T(\theta, \phi) = \begin{pmatrix} e^{i\phi}\cos(\theta) & -e^{i\phi}\sin(\theta) \\ \sin(\theta) & \cos(\theta) \end{pmatrix} \quad \text{Eq. 1}$$

A matrix is a "unitary" matrix U such that $U^T U=I$. Mathematically, any unitary matrix can be decomposed into the product of a series of U(2) matrices, as given by Equation 2.

$$U = \prod_{i=0}^{\frac{n(n-1)}{2}-1} T_i(\theta) \quad \text{Eq. 2}$$

In certain embodiments, OMAC element 220 computes the product of a 4×4 unit matrix and a 4-value vector. In other embodiments, OMAC element 220 may compute an arbitrary-size matrix multiplication Y=W*A. Matrix W (n×m) is pre-processed using a single value decomposition (SVD) $W=U \wedge V^T$, where U is an "n×n" unit matrix, V is an "m×m" unit matrix and $\wedge$ is an "n×m" diagonal matrix. Additionally, U and V may be decomposed into the products of an SU(2) matrix, as given by Equation 3, and implemented by OMAC element 220.

$$U = \prod_{i=0}^{\frac{n(n-1)}{2}-1} T(\theta_i) \quad \text{Eq. 3}$$

For any "n×n" unit matrix U, the corresponding phase shift values are given by Equation 4.

$$\{\theta_i\} = \left\{ \theta_0, \theta_1, \ldots, \theta_{\frac{n(n-1)}{2}-1} \right\} \quad \text{Eq. 4}$$

Additionally, any diagonal element $\wedge_i$ of $\wedge$ may be represented as cos (Of) after a linear rescaling. In many embodiments, the matrix A may be ignored, and the U and V matrices may be programmed onto an appropriately-sized OMAC element 200, with corresponding phase shift values $\{\theta_i\}$, to multiply matrices efficiently.

OMAC module 200 advantageously computes matrix multiplications of weights and activations in ML applications, such as ANNs. In certain situations, the phase shift values $\{\theta_i\}$ may require high precision encoding, such as, for example, 32-bit floating point values, fixed point values with very wide bit-widths, etc. Embodiments of the present disclosure advantageously retrain or finetune an ANN to quantize phase shift values into discrete angles, such as, for example, the multiple of a quantum angle $\gamma=360°/256$, $\{\theta_i\} = \{\gamma k_i | k_i \in Z_{256}\}$. In this example, the phase shift values are 8-bit integers. Other integer bit-widths are also contemplated, such as 2-bit integers, 4-bit integers, etc. In certain embodiments, the integer bit width may be greater than or equal to 2-bits and less than or equal to 16 bits.

Advantageously, quantized phase shift values reduce the memory required to store the ANN weights, which ranges from 1 MB to 100 MB or larger, as well as the power required execute the ANN model. In an alternative embodiment, the quantization may be determined statistically without the need for ANN model training.

Figure 7:
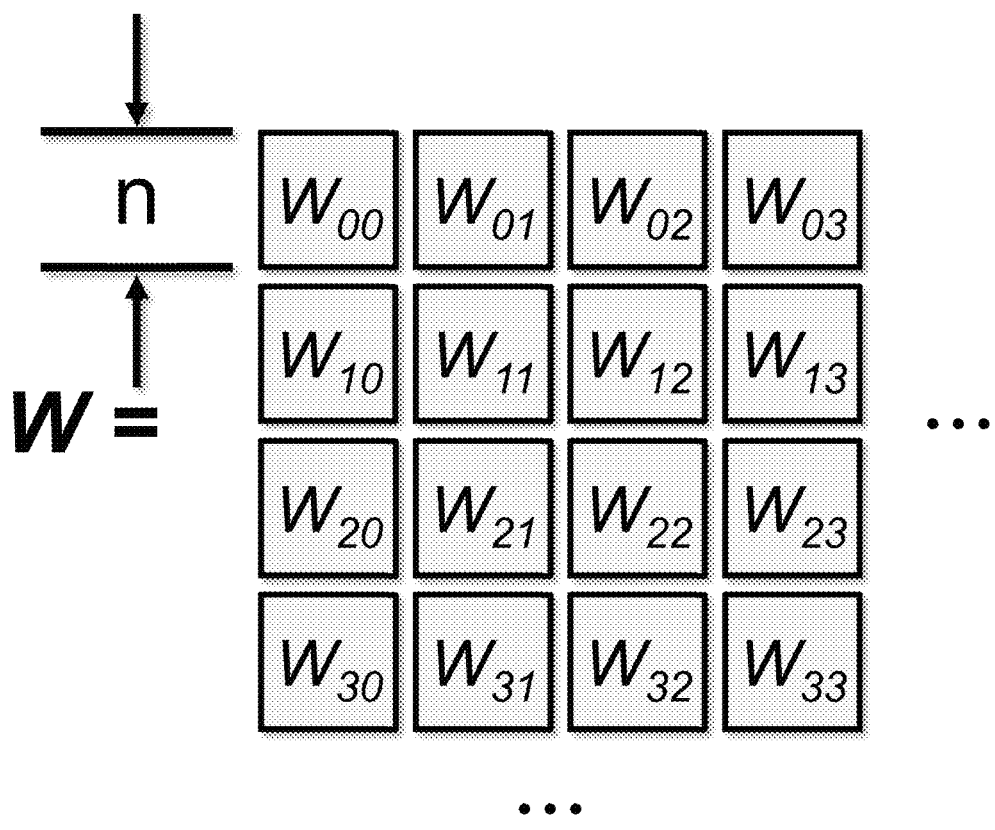
FIG. 7 depicts a block diagram of weight matrix, in accordance with embodiments of the present disclosure.

Generally, the phase quantization process may be described as follows. First, the ANN model is trained to determine unquantized ANN weights. Each unquantized ANN weight includes an unquantized phase shift value $\Theta_i$ and a phase shift value A weight matrix W is formed from the unquantized ANN weights. The weight matrix W is then decomposed into the direct sum of an "n×n" tile matrix $W_i$, as given by Equation 5 and depicted in FIG. 7, where n is an arbitrary constant that is chosen based on the size of the OMAC module 200, such as, for example, n=128. Each ANN weight tile includes a number of unquantized ANN weights.

$$W = \oplus_i W_i \quad \text{Eq. 5}$$

Each ANN weight tile is quantized to create a quantized ANN weight tile. Each quantized ANN weight tile includes a number of quantized ANN weights. Each quantized ANN weight including a quantized phase shift value $\theta_i$ and a phase shift value $\phi_i$. In certain embodiments, the phase quantizer is applied to each "n×n" tile matrix $W_i$ by performing an SVD to $W_i$, i.e., $W_i = U_i \wedge_i V_i^T$, where $U_i$ and $V_i^T$ are unit matrices, a U(2) decomposition to $U_i$ and $V_i^T$ is performed (as given by Equations 6 and 7), and phase shift $\theta_i$ is quantized (as given by Equations 8, 9 and 10), where m is the bit-width of quantization, and the bracket function, i.e., "[ ]," is the rounding function (e.g., [12.35]=12).

$$U_i = \prod_k^{\frac{n(n-1)}{2}} T_i(\theta_k) \quad \text{Eq. 6}$$

$$\overline{V}_i = \prod_k^{\frac{n(n-1)}{2}} T_i(\theta'_k) \quad \text{Eq. 7}$$

$$Q(\theta_k) = \left[\frac{\theta_k}{\gamma}\right] \quad \text{Eq. 8}$$

$$Q(\theta'_k) = \left[\frac{\theta'_k}{\gamma}\right] \quad \text{Eq. 9}$$

$$\gamma = \frac{2\pi}{2^m} \quad \text{Eq. 10}$$

Third, W is approximated using quantized phase $Q(\theta_k)$ and $Q(\theta'_k)$ as given by Equation 11.

$$W_i \approx \overline{W}_i = \left(\prod_k^{\frac{n(n-1)}{2}} T_i(Q(\theta_k))\right) \Lambda_i \left(\prod_k^{\frac{n(n-1)}{2}} T_i(Q(\theta'_k))\right) \quad \text{Eq. 11}$$

The quantized ANN weight tiles are formed into a quantized ANN weight matrix, and the quantized ANN matrix is formed into ANN weights. Finally, the approximation errors may be reduced or eliminated by ANN retraining. During retraining, the original weights are replaced by phase quantized weight $Q_p(W)$ in the forward path computation, and, in the backward path computation, the gradient update to the weights is backpropagated. In certain embodiments, phase shift gradients are not generated, and, instead, the SVD of each "n×n" matrix tile is computed for each training step. Advantageously, through ANN training, the quantized phase may be efficiently encoded in the lowest bit-width.

Generally, there are many phase shift values $\phi_i$ in a weight tile. In certain embodiments, each weight in a weight tile includes a quantized phase shift value $\theta_i$ and a phase shift value In other embodiments, there may be fewer phase shift value $\phi_i$—for example, for a "64×64" weight tile (4,096 quantized phase shift values $\theta_i$), there are 1,984 phase shift values $\phi_i$ (i.e., 64*(63−1)/2). In certain embodiments, one phase shift value $\phi_i$ may be either 0° or 180°, such as, for example, the last phase shift value $\phi_N$, while the remaining phase shift values $\phi_i$ are 0°. In these embodiments, the phase shift values $\phi_i$ may be encoded at near zero cost since only one phase shift value $\phi_i$ per weight tile, equal to 0° or 180°, needs to be encoded.

Figure 8:
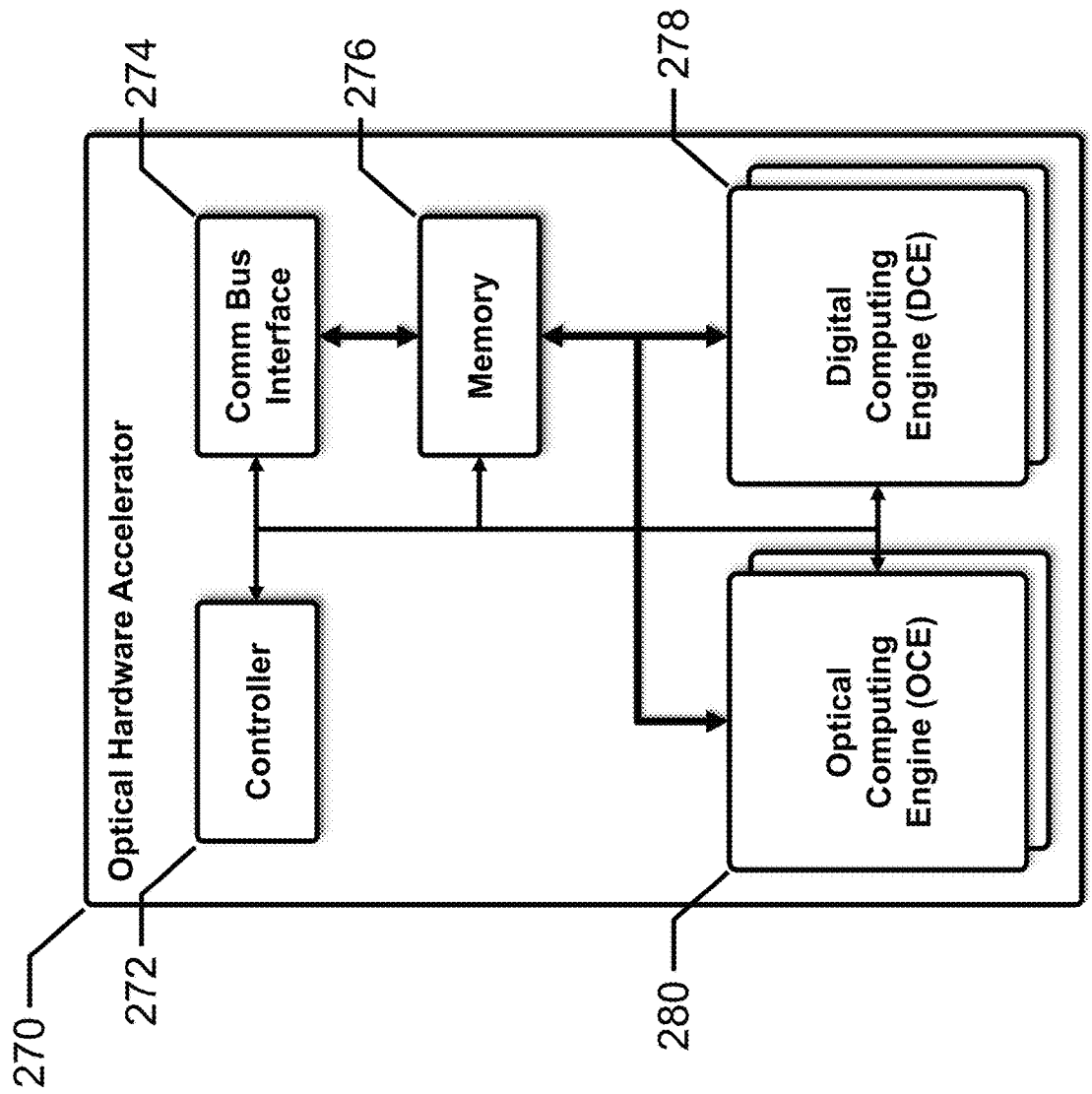
FIG. 8 depicts a block diagram of an optical hardware accelerator for an ANN, in accordance with an alternative embodiment of the present disclosure.

FIG. 8 depicts a block diagram of an OHA 270 for an ANN, in accordance with an alternative embodiment of the present disclosure.

OHA 270 includes controller 272, communication bus interface 274, memory 276, one or more DCEs 278 and one or more OCEs 280. Controller 272, communication bus interface 274, memory 276 and OCE 280 provide the same or similar functionality as controller 172, communication bus interface 174, memory 176, and OCE 180, respectively. Generally, OHA 270 receives input data from memory 130 over communication bus 110, and transmits output data to memory 130 over communication bus 110.

In one embodiment, OCE 280 executes the input, convolutional, activation and pooling layers of a CNN, while DCE 278 executes the fully-connected and output layers; other configurations are also contemplated. OCE 280 reads the input data from memory 276, and generates and stores intermediate output data in memory 276. DCE 278 reads the intermediate output data from memory 276, and generates and stores the output data in memory 276.

DCE 278 may include an interface to memory 276, local volatile or non-volatile memory, and one or more processors. In one embodiment, the processors execute the fully-connected and output layers of a CNN. The model and weights for the fully-connected and output layers of the CNN are stored in local non-volatile memory, or, alternatively, in memory 276. In this embodiment, a single DCE 278 executes the fully-connected and output layers of the CNN. Other embodiments execute other types of ANNs.

In further embodiments, multiple DCEs 278 may be interconnected by a NoC using a ring topology, a star topology, a mesh topology, etc. Alternatively, multiple DCEs 278 may be interconnected using a cross-bar switch, direct connections, etc.

Figure 9:
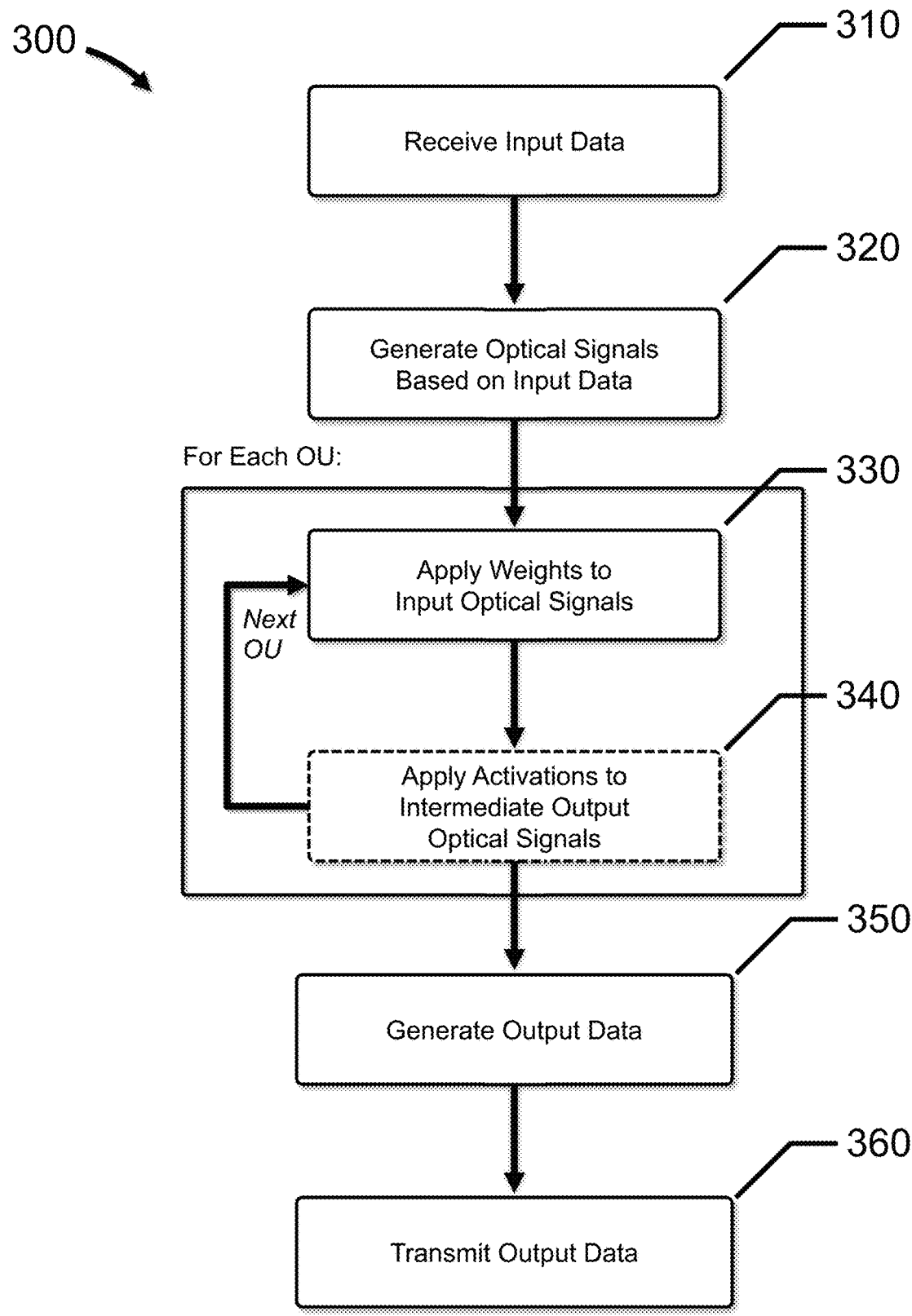
FIG. 9 depicts a flow diagram presenting functionality for accelerating an ANN using an optical hardware accelerator, in accordance with embodiments of the present disclosure.

FIG. 9 depicts a flow diagram 300 presenting functionality for accelerating an ANN using OHA 170, in accordance with embodiments of the present disclosure.

At 310, input data are received via communication bus interface 174.

At 320, 330, 340 and 350, the ANN model with ANN weights is executed by OCE 180. Each ANN weight includes a quantized phase shift value $\theta_i$ and a phase shift value $\phi_i$.

At 320, input optical signals are generated, by D/O converter 186, based on the input data.

Each OU 192 executes the functionality at 330 and 340. As discussed above, ONN 190 is configured to generate output optical signals based on the input optical signals and includes an array of OUs 192 that are optically-coupled, in a particular configuration, to implement a particular ANN model. Accordingly, one or more OUs 192 are arranged to implement each layer of the ANN model. Each OU 192 includes an OMAC module 200, In an alternative embodiment, each OU 192 also includes an associated OA module 230.

At 330, corresponding ANN weights are applied to optical signals by each OMAC module 200.

In an alternative embodiment, at 340, a nonlinear phase shift is applied, by each OA module 230, to the optical signals from the associated OMAC module 200.

At 350, output data are generated, by O/D converter 188, based on the output optical signals from ONN 190.

At 360, the output data are transmitted via communication bus interface 174.

As discussed above, embodiments of the present disclosure advantageously provide an optical hardware accelerator (OHA) for an ANN that includes an optical computing engine (OCE) that is configured to execute an ANN model with ANN weights. The ANN weights are phase shift values that are determined and quantized during the training of the ANN model. Due to the physical properties of the optical medium and the quantized phase shift values, the ANN optical hardware accelerator advantageously provides much faster computation, significantly reduces power consumption, and reduces memory bandwidth when compared to conventional ANN hardware accelerators.

The embodiments described herein are combinable.

In one embodiment, an optical computing engine (OCE) is configured to execute at least a portion of an artificial neural network (ANN) model with ANN weights, each ANN weight including a quantized phase shift value $\theta_i$ and a phase shift value $\phi_i$. The OCE includes a digital-to-optical (D/O) converter configured to generate input optical signals based on input data; an optical neural network (ONN), configured to generate output optical signals based on the input optical signals, the ONN including a plurality of optical units (OUs), each OU including an optical multiply and accumulate (OMAC) module, each OMAC module including an array of OMAC elements, each OMAC element including a Mach-Zehnder Interferometer (MZI) and a single-node phase shifter, each MZI configured to apply a phase shift equal to the quantized phase shift value $\theta_i$ of a corresponding ANN weight to an optical signal, each single-node phase shifter configured to apply a phase shift equal to the phase shift value $\phi_i$ of the corresponding ANN weight to the optical signal; and an optical-to-digital (O/D) converter configured to generate output data based on the output optical signals.

In another embodiment of the OCE, the quantized phase shift value $\theta_i$ of each ANN weight is quantized to a bit-width that is greater than or equal to 2 bits and less than or equal to 16 bits; and a phase shift value $\phi_i$ of zero (0) represents 0 radians of phase shift, and a phase shift value $\phi_i$ of one (1) represents $\pi$ radians of phase shift.

In another embodiment of the OCE, each quantized phase shift value $\theta_i$ is calculated by multiplying an unquantized phase shift value $\phi_i$ by $(2\pi c)/(2^8)$ and rounding the result to an 8-bit integer value.

In another embodiment of the OCE, each OU includes an optical activation (OA) module configured to apply a nonlinear phase shift to the optical signals from the OMAC module In one embodiment, an optical hardware accelerator for an artificial neural network (ANN) includes a communication bus interface configured to receive input data and transmit output data; a memory, coupled to the communication bus interface, configured to store the input data and the output data; a controller coupled to the communication bus interface and the memory; and an optical computing engine (OCE), coupled to the memory and the controller, configured to execute at least a portion of an ANN model with ANN weights, each ANN weight including a quantized phase shift value $\theta_i$ and a phase shift value $\phi_i$. The OCE includes a digital-to-optical (D/O) converter configured to generate input optical signals based on the input data, an optical neural network (ONN), configured to generate output optical signals based on the input optical signals, the ONN including a plurality of optical units (OUs), each OU including an optical multiply and accumulate (OMAC) module, each OMAC module including an array of OMAC elements, each OMAC element including a Mach-Zehnder Interferometer (MZI) and a single-node phase shifter, each MZI configured to apply a phase shift equal to the quantized phase shift value $\theta_i$ of a corresponding ANN weight to an optical signal, each single-node phase shifter configured to apply a phase shift equal to the phase shift value $\phi_i$ of the corresponding ANN weight to the optical signal, and an optical-to-digital (O/D) converter configured to generate the output data based on the output optical signals In another embodiment of the optical hardware accelerator, the quantized phase shift value $\theta_i$ of each ANN weight is quantized to a bit-width that is greater than or equal to 2 bits and less than or equal to 16 bits; and a phase shift value $\phi_i$ of zero (0) represents 0 radians of phase shift, and a phase shift value $\phi_i$ of one (1) represents $\pi$ radians of phase shift In another embodiment of the optical hardware accelerator, each quantized phase shift value $\theta_i$ is calculated by multiplying an unquantized phase shift value $\Theta_i$ by $(2\pi)/(2^8)$ and rounding the result to an 8-bit integer value.

In another embodiment of the optical hardware accelerator, each OU includes an optical activation (OA) module configured to apply a nonlinear phase shift to the optical signals from the OMAC module.

In another embodiment of the optical hardware accelerator, the ANN model is a convolutional neural network (CNN) model including at least one convolutional layer, the portion of the ANN model is at least a portion of the convolutional layer, and the quantized phase shift value $\theta_i$ and the phase shift value $\phi_i$ of each ANN weight are determined during CNN model training.

In another embodiment of the optical hardware accelerator, the CNN model training includes back propagation of errors without gradient descent.

In another embodiment of the optical hardware accelerator, the ANN model includes an input layer, one or more hidden layers, and an output layer, and each OU is assigned to one of the ANN model layers; the input optical signals are provided to the OUs in the input layer; optical signals generated by the OUs in the input layer are provided to the OUs in a succeeding hidden layer; optical signals generated by the OUs in each hidden layer are provided to succeeding OUs in the same hidden layer, the OUs in a succeeding hidden layer or the OUs in the output layer; and optical signals generated by the OUs in the output layer are provided to the O/D converter.

In another embodiment of the optical hardware accelerator, at least one of the hidden layers is a fully-connected layer with digital weights, and the optical hardware accelerator further comprises a digital computing engine (DCE), coupled to the memory and the controller, configured to execute the fully-connected layer using the digital weights.

In one embodiment, a method for accelerating an artificial neural network (ANN) using an optical hardware accelerator includes receiving, via a communications bus interface, input data; executing, by an optical computing engine (OCE), at least a portion of an ANN model with ANN weights, each ANN weight including a quantized phase shift value $\theta_i$ and a phase shift value $\phi_i$, the OCE including a digital-to-optical (D/O) converter, an optical neural network (ONN) configured to generate output optical signals based on input optical signals, and an optical-to-digital (O/D) converter, the ONN including a plurality of optical units (OUs), each OU including an optical multiply and accumulate (OMAC) module, each OMAC module including an array of OMAC elements, each OMAC element including a Mach Zehnder Interferometer (MZI) and a single-node phase shifter, the executing including at the D/O converter, generating the input optical signals based on the input data, at each OMAC element of each OMAC module, applying, by the MZI, a phase shift equal to the quantized phase shift value $\theta_i$ of a corresponding ANN weight to an optical signal, and applying, by the single-node phase shifter, a phase shift equal to the phase shift value $\phi_i$ of the corresponding ANN weight to the optical signal, and at the O/D converter, generating output data based on the output optical signals; and transmitting, via the communications bus interface, the output data.

In another embodiment of the method, the quantized phase shift value $\theta_i$ of each ANN weight is quantized to a bit-width that is greater than or equal to 2 bits and less than or equal to 16 bits; and a phase shift value $\phi_i$ of zero (0) represents 0 radians of phase shift, and a phase shift value $\phi_i$ of one (1) represents $\pi$ radians of phase shift.

In another embodiment of the method, each quantized phase shift value $\theta_i$ is calculated by multiplying an unquantized phase shift value $\Theta_i$ by $(2\pi)/(2^8)$ and rounding the result to an 8-bit integer value.

In another embodiment of the method, each OU includes an optical activation (OA) module, and the method further comprises at each OA module, applying a nonlinear phase shift to the optical signals from the OMAC module.

In another embodiment of the method, the ANN model is a convolutional neural network (CNN) model including at least one convolutional layer, the portion of the ANN model is at least a portion of the convolutional layer, and the quantized phase shift value $\theta_i$ and the phase shift value $\phi_i$ of each ANN weight are determined during CNN model training.

In another embodiment of the method, the CNN model training includes back propagation of errors without gradient descent.

In another embodiment of the method, the ANN model includes an input layer, one or more hidden layers, and an output layer, each OU is assigned to one of the ANN model layers, and the method further comprises In another embodiment of the method, providing the input optical signals to the OUs in the input layer; providing optical signals generated by the OUs in the input layer to the OUs in a succeeding hidden layer; providing optical signals generated by the OUs in each hidden layer to succeeding OUs in the same hidden layer, the OUs in a succeeding hidden layer or the OUs in the output layer; and providing optical signals generated by the OUs in the output layer to the O/D converter.

In another embodiment of the method, the CNN model includes at least one fully-connected layer with digital weights, and the method further comprises executing, by a digital computing engine (DCE), the fully-connected layer using the digital weights.

In one embodiment, a method for training an artificial neural network (ANN) for use with an optical hardware accelerator includes training an ANN model to determine unquantized ANN weights, each unquantized ANN weight including an unquantized phase shift value $\Theta_i$ and a phase shift value $\phi_i$; forming an ANN weight matrix from the unquantized ANN weights; decomposing the ANN weight matrix into a plurality of ANN weight tiles, each ANN weight tile including a number of unquantized ANN weights; quantizing each ANN weight tile to create a quantized ANN weight tile, each quantized ANN weight tile including a number of quantized ANN weights, each quantized ANN weight including a quantized phase shift value $\theta_i$ and a phase shift value $\phi_i$; forming the quantized ANN weight tiles into a quantized ANN weight matrix; forming the quantized ANN matrix into ANN weights; and retraining the ANN model based on the ANN weights.

In another embodiment of the training method, the quantized phase shift value $\theta_i$ of each ANN weight is quantized to a bit-width that is greater than or equal to 2 bits and less than or equal to 16 bits, a phase shift value $\phi_i$ of zero (0) represents 0 radians of phase shift, and a phase shift value $\phi_i$ of one (1) represents $\pi$ radians of phase shift.

In another embodiment of the training method, each quantized phase shift value $\theta_i$ is calculated by multiplying an unquantized phase shift value $\Theta_i$ by $(2\pi)/(2^8)$ and rounding the result to an 8-bit integer value.

In another embodiment of the training method, the ANN model is a convolutional neural network (CNN) model including at least one convolutional layer, and the training includes back propagation of errors without gradient descent.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An optical computing engine (OCE), configured to execute at least a portion of an artificial neural network (ANN) model with ANN weights, each ANN weight including a quantized phase shift value $\theta_i$ and a phase shift value $\phi_i$, the OCE comprising:
   a digital-to-optical (D/O) converter configured to generate input optical signals based on input data;
   an optical neural network (ONN), configured to generate output optical signals based on the input optical signals, the ONN including a plurality of optical units (OUs), each OU including an optical multiply and accumulate (OMAC) module, each OMAC module including an array of OMAC elements, each OMAC element including a Mach-Zehnder Interferometer (MZI) and a single-node phase shifter, each MZI configured to apply a phase shift equal to the quantized phase shift value $\theta_i$ of a corresponding ANN weight to an optical signal, each single-node phase shifter configured to apply a phase shift equal to the phase shift value $\phi_i$ of the corresponding ANN weight to the optical signal; and
   an optical-to-digital (O/D) converter configured to generate output data based on the output optical signals.

2. The OCE of claim 1, where:
   the quantized phase shift value $\theta_i$ of each ANN weight is quantized to a bit-width that is greater than or equal to 2 bits and less than or equal to 16 bits; and
   a phase shift value $\phi_i$ of zero (0) represents 0 radians of phase shift, and a phase shift value $\phi_i$ of one (1) represents $\pi$ radians of phase shift.

3. The OCE of claim 2, where each quantized phase shift value $\theta_i$ is calculated by multiplying an unquantized phase shift value $\Theta_i$ by $(2\pi)/(2^8)$ and rounding the result to an 8-bit integer value.

4. The OCE of claim 1, where each OU includes an optical activation (OA) module configured to apply a nonlinear phase shift to the optical signals from the OMAC module.

5. An optical hardware accelerator for an artificial neural network (ANN), comprising:
   a communication bus interface configured to receive input data and transmit output data;
   a memory, coupled to the communication bus interface, configured to store the input data and the output data;
   a controller coupled to the communication bus interface and the memory; and
   an optical computing engine (OCE), coupled to the memory and the controller, configured to execute at least a portion of an ANN model with ANN weights, each ANN weight including a quantized phase shift value $\theta_i$ and a phase shift value $\phi_i$, the OCE including:
      a digital-to-optical (D/O) converter configured to generate input optical signals based on the input data,
      an optical neural network (ONN), configured to generate output optical signals based on the input optical signals, the ONN including a plurality of optical units (OUs), each OU including an optical multiply and accumulate (OMAC) module, each OMAC module including an array of OMAC elements, each OMAC element including a Mach-Zehnder Interferometer (MZI) and a single-node phase shifter, each MZI configured to apply a phase shift equal to the quantized phase shift value $\theta_i$ of a corresponding ANN weight to an optical signal, each single-node phase shifter configured to apply a phase shift equal to the phase shift value $\phi_i$ of the corresponding ANN weight to the optical signal, and
      an optical-to-digital (O/D) converter configured to generate the output data based on the output optical signals.

6. The optical hardware accelerator of claim 5, where:
the quantized phase shift value $\theta_i$ of each ANN weight is quantized to a bit-width that is greater than or equal to 2 bits and less than or equal to 16 bits; and
a phase shift value $\phi_i$ of zero (0) represents 0 radians of phase shift, and a phase shift value $\phi_i$ of one (1) represents π radians of phase shift.

7. The optical hardware accelerator of claim 6, where each quantized phase shift value $\theta_i$ is calculated by multiplying an unquantized phase shift value $\Theta_i$ by $(2\pi)/(2^8)$ and rounding the result to an 8-bit integer value.

8. The optical hardware accelerator of claim 5, where each OU includes an optical activation (OA) module configured to apply a nonlinear phase shift to the optical signals from the OMAC module.

9. The optical hardware accelerator of claim 5, where the ANN model is a convolutional neural network (CNN) model including at least one convolutional layer, the portion of the ANN model is at least a portion of the convolutional layer, and the quantized phase shift value $\theta_i$ and the phase shift value $\phi_i$ of each ANN weight are determined during CNN model training.

10. The optical hardware accelerator of claim 9, where the CNN model training includes back propagation of errors without gradient descent.

11. The optical hardware accelerator of claim 5, where:
the ANN model includes an input layer, one or more hidden layers, and an output layer, and each OU is assigned to one of the ANN model layers;
the input optical signals are provided to the OUs in the input layer;
optical signals generated by the OUs in the input layer are provided to the OUs in a succeeding hidden layer;
optical signals generated by the OUs in each hidden layer are provided to succeeding OUs in the same hidden layer, the OUs in a succeeding hidden layer or the OUs in the output layer; and
optical signals generated by the OUs in the output layer are provided to the O/D converter.

12. The optical hardware accelerator of claim 11, where at least one of the hidden layers is a fully-connected layer with digital weights, and the optical hardware accelerator further comprises a digital computing engine (DCE), coupled to the memory and the controller, configured to execute the fully-connected layer using the digital weights.

13. A method for accelerating an artificial neural network (ANN) using an optical hardware accelerator, comprising:
receiving, via a communications bus interface, input data;
executing, by an optical computing engine (OCE), at least a portion of an ANN model with ANN weights, each ANN weight including a quantized phase shift value $\theta_i$ and a phase shift value $\phi_i$, the OCE including a digital-to-optical (D/O) converter, an optical neural network (ONN) configured to generate output optical signals based on input optical signals, and an optical-to-digital (O/D) converter, the ONN including a plurality of optical units (OUs), each OU including an optical multiply and accumulate (OMAC) module, each OMAC module including an array of OMAC elements, each OMAC element including a Mach-Zehnder Interferometer (MZI) and a single-node phase shifter, the executing including:
at the D/O converter, generating the input optical signals based on the input data,
at each OMAC element of each OMAC module, applying, by the MZI, a phase shift equal to the quantized phase shift value $\theta_i$ of a corresponding ANN weight to an optical signal, and applying, by the single-node phase shifter, a phase shift equal to the phase shift value $\phi_i$ of the corresponding ANN weight to the optical signal, and
at the O/D converter, generating output data based on the output optical signals; and
transmitting, via the communications bus interface, the output data.

14. The method of claim 13, where:
the quantized phase shift value $\theta_i$ of each ANN weight is quantized to a bit-width that is greater than or equal to 2 bits and less than or equal to 16 bits; and
a phase shift value $\phi_i$ of zero (0) represents 0 radians of phase shift, and a phase shift value $\phi_i$ of one (1) represents π radians of phase shift.

15. The method of claim 14, where each quantized phase shift value $\theta_i$ is calculated by multiplying an unquantized phase shift value $\Theta_i$ by $(2\pi)/(2^8)$ and rounding the result to an 8-bit integer value.

16. The method of claim 13, where each OU includes an optical activation (OA) module, and the method further comprises:
at each OA module, applying a nonlinear phase shift to the optical signals from the OMAC module.

17. The method of claim 13, where the ANN model is a convolutional neural network (CNN) model including at least one convolutional layer, the portion of the ANN model is at least a portion of the convolutional layer, and the quantized phase shift value $\theta_i$ and the phase shift value $\phi_i$ of each ANN weight are determined during CNN model training.

18. The method of claim 17, where the CNN model training includes back propagation of errors without gradient descent.

19. The method of claim 13, where the ANN model includes an input layer, one or more hidden layers, and an output layer, each OU is assigned to one of the ANN model layers, and the method further comprises:
providing the input optical signals to the OUs in the input layer;
providing optical signals generated by the OUs in the input layer to the OUs in a succeeding hidden layer;
providing optical signals generated by the OUs in each hidden layer to succeeding OUs in the same hidden layer, the OUs in a succeeding hidden layer or the OUs in the output layer; and
providing optical signals generated by the OUs in the output layer to the O/D converter.

20. The method of claim 17, where the CNN model includes at least one fully-connected layer with digital weights, and the method further comprises:
executing, by a digital computing engine (DCE), the fully-connected layer using the digital weights.

21. A method for training an artificial neural network (ANN) for use with an optical hardware accelerator, comprising:
training an ANN model to determine unquantized ANN weights, each unquantized ANN weight including an unquantized phase shift value $\phi_i$ and a phase shift value $\phi_i$;
forming an ANN weight matrix from the unquantized ANN weights;
decomposing the ANN weight matrix into a plurality of ANN weight tiles, each ANN weight tile including a number of unquantized ANN weights;
quantizing each ANN weight tile to create a quantized ANN weight tile, each quantized ANN weight tile including a number of quantized ANN weights, each quantized ANN weight including a quantized phase shift value $\theta_i$ and a phase shift value $\phi_i$;

forming the quantized ANN weight tiles into a quantized ANN weight matrix;

forming the quantized ANN matrix into ANN weights; and retraining the ANN model based on the ANN weights.

22. The method of claim 21, where the quantized phase shift value $\theta_i$ of each ANN weight is quantized to a bit-width that is greater than or equal to 2 bits and less than or equal to 16 bits, a phase shift value $\phi_i$ of zero (0) represents 0 radians of phase shift, and a phase shift value $\phi_i$ of one (1) represents $\pi$ radians of phase shift.

23. The method of claim 22, where each quantized phase shift value $\theta_i$ is calculated by multiplying an unquantized phase shift value $\Theta_i$ by $(2\pi)/(2^8)$ and rounding the result to an 8-bit integer value.

24. The method of claim 21, where the ANN model is a convolutional neural network (CNN) model including at least one convolutional layer, and the training includes back propagation of errors without gradient descent.

* * * * *